July 10, 1934.     C. E. FURGASON     1,966,289
CLUTCH FOR TRANSMISSION MECHANISM
Original Filed July 18, 1927
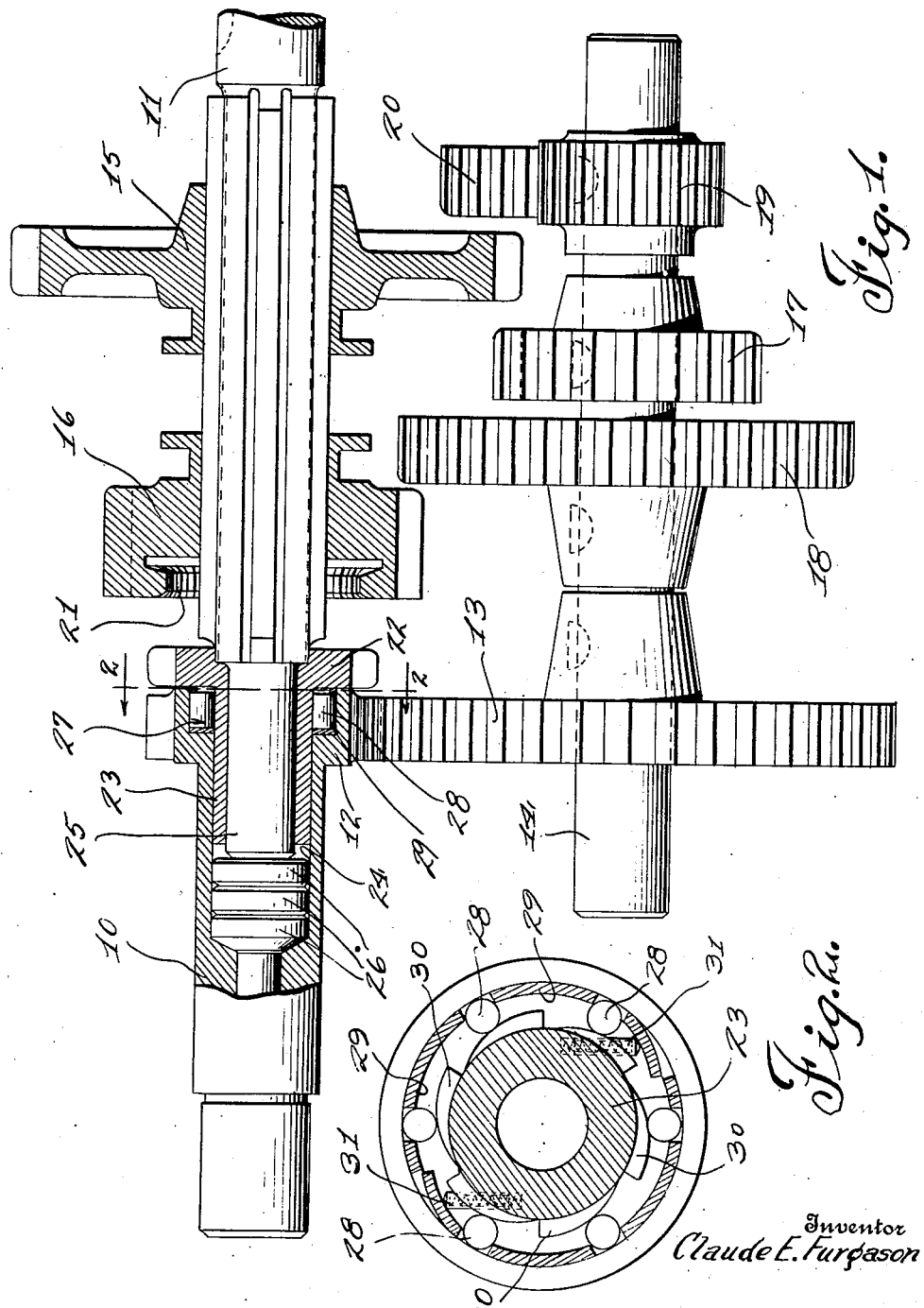
Inventor
Claude E. Furgason Patented July 10, 1934

1,966,289

UNITED STATES PATENT OFFICE 1,966,289

CLUTCH FOR TRANSMISSION MECHANISM

Claude E. Furgason, Lansing, Mich., assignor, by mesne assignments, to L. G. S. Devices Corporation, a corporation of Indiana Application July 18, 1927, Serial No. 206,636
Renewed January 27, 1933

1 Claim. (Cl. 192—48)

This invention relates to a clutch for transmission mechanism or change speed gears and more particularly to improvements therein providing means for permitting the driven shaft of the gearing, when the gears are shifted for direct drive, to travel faster than the driving shaft.

The invention finds particular utility, although it is not necessarily so limited, when used in connection with motor vehicles because when thus employed this invention permits the vehicle to coast or travel under its own momentum independently of the engine.

In change speed transmission gearing of the character with which this invention is associated there is provided a driving shaft, a driven shaft and a counter shaft together with gears drivingly connecting said driving shaft to said counter shaft and shiftable gears, for instance on said driven shaft, engageable with said gears on said counter shaft for driving said driven shaft at variable speeds. Direct or high speed is usually provided by directly coupling the driving shaft to the driven shaft and in accordance with this invention a one way clutch is interposed between the driving shaft and the member carried thereby and used in direct drive whereby during high speed or direct drive the driven shaft may rotate relatively faster or indepndently 'of the driving shaft. By arranging the one way clutch between the driving shaft and the direct drive member carried thereby the drive through the remaining gears is unaffected. Thus in first and second speeds the motor may be used as a brake as is customary with motor vehicles.

Other advantages are obtainable with the present invention, it being found that the gears may be shifted into high speed or direct drive more easily and furthermore that the provision of this one way clutch between the driving and driven shafts eliminates what is commonly known as "bucking". This bucking is usually the result of alternating variances in the speed of the motor and the vehicle wherein momentarily the motor is running faster than the vehicle and vice versa. With the present invention this objection is entirely eliminated and a much smoother movement of the vehicle results.

The several objects, advantages and novel details of construction of this invention will be made more apparent as this description proceeds, especially when considered in connection with the accompanying drawing wherein:

Figure 1 is a longitudinal sectional elevational view of a change speed transmission gearing with this invention associated therewith, and Figure 2 is an enlarged detail sectional view taken substantially on line 2—2 in Figure 1.

The type of transmission gearing herein illustrated includes a driving shaft 10 connected to and driven by the motor (not shown) and a driven shaft 11 connected as usual to the rear wheels of the motor vehicle. The driving shaft 10 carries a driving gear 12 which meshes with a gear 13 on a counter shaft 14. The driven shaft 11 has keyed thereto longitudinally slidable gears 15 and 16 adapted to mesh with gears 17 and 18 carried by counter shaft 14 for low and intermediate speeds respectively. Counter shaft 14 is also provided with a gear 19, an idler gear 20 being provided whereby reverse may be obtained through slidable gear 15.

Gear 16 is provided with a plurality of teeth 21 constituting the member or means on the driven shaft for coupling the driven shaft to the driving shaft for direct drive or high speed. Cooperating with the means 21 is a clutch member 22, here shown as provided with a sleeve 23, telescoping within the hollow portion or bore 24 of the driving shaft 10. Extending through the sleeve 23 of clutch member 22 is the end 25 of the driven shaft 11, the end of this shaft abutting against one of a plurality of thrust plates 26 arranged in the bore 24.

By this construction the clutch member 22 is rotatably journaled within the driving shaft 10 and for drivingly connecting the clutch member to the shaft 10, I provide a one way clutch indicated generally by the reference character 27.

While this overrunning or one way clutch may be of any preferred or desired construction, I have herein illustrated the same as comprising a plurality of rollers 28 arranged in the recessed end 29 of shaft 10. Cooperating with these rollers is a corresponding number of cam surfaces 30 formed integral with or carried by the outer surface of sleeve 23 of clutch member 22. Rotation of shaft 10 in one direction will cause the rollers to be wedged between the cam surfaces 30 and the inner wall of recess 29 whereupon clutch member 22 will be coupled to shaft 10 for rotation therewith. It is obvious however that clutch member 22 will be permitted to rotate freely or independently of shaft 10 in the normal direction of rotation of the shaft. Spring pressed plungers 31 or any other suitable means may be provided for normally imparting a slight relative movement between the clutch parts so that the clutch member 22 may normally freely revolve relative to the shaft 10 except when the speed of rotation of the shaft 10 is in excess of that of the clutch member 22.

Gear 16 is adapted to be shifted along driven shaft 11 to bring the toothed portion 21 thereof in engagement with the clutch member 22 for high speed or direct drive and when these parts are in engagement it will be obvious that shaft 11 may be driven by shaft 10 but shaft 11 and consequently the motor vehicle may coast or travel at a speed in excess of that at which shaft 10 is rotated. Inasmuch as the gear 12 which drives counter shaft 14 through gear 13 is carried directly by driving shaft 10 first and second speeds and reverse will be driven in accordance with the rotation of driving shaft 10, the coasting of the vehicle being permitted only in high speed. Thus the motor of the vehicle may be used as a brake during the other speeds as is now customary.

While an embodiment of the invention has been described and illustrated herein somewhat in detail it will be readily apparent to those skilled in this art that various changes and modifications may be resorted to without departing from the spirit and scope of this invention and to this end reservation is made to make such changes as may come within the purview of the accompanying claim.

What I claim as my invention is:—

In a transmission gearing, the combination of a driving shaft having a central longitudinally extending bore at one end thereof, a coaxial driven shaft having a reduced end of less diameter than the bore projecting into said bore, a slidable gear on said driven shaft, a clutch member at the said one end of the driving shaft adapted upon shift of the gear in one direction to engage the gear for direct drive and embodying a sleeve-like part fitting within the bore and extending around and forming a bearing for the reduced end of the driven shaft, and means connecting said clutch member to said driving shaft permitting relative rotation of said clutch member in one direction.

CLAUDE E. FURGASON.